(12) United States Patent
Gelb et al.

(10) Patent No.: US 7,908,708 B2
(45) Date of Patent: Mar. 22, 2011

(54) SURFACE COVER WITH SNAP HAVING A DRILL GUIDE

(76) Inventors: Michael Steven Gelb, Cumming, GA (US); Geoffrey Albert Dellapenna, Alpharetta, GA (US)

( * ) Notice: Subject to any disclaimer, the term of this patent is extended or adjusted under 35 U.S.C. 154(b) by 510 days.

(21) Appl. No.: 12/009,756

(22) Filed: Jan. 22, 2008

(65) Prior Publication Data

US 2009/0129886 A1 May 21, 2009

(51) Int. Cl.
*A47G 27/04* (2006.01)
(52) U.S. Cl. .................. 16/4; 52/506.05; 24/581.11
(58) Field of Classification Search .............. 16/4, 17.1; 52/506.05; 29/525.11; 24/297, 586.11, 581.11, 24/581.1; 411/372.5, 344, 383, 509
See application file for complete search history.

(56) References Cited

U.S. PATENT DOCUMENTS

| | | | |
|---|---|---|---|
| 724,884 | A | 4/1903 | Kingston |
| 1,488,450 | A | 5/1924 | Dews |
| 4,406,033 | A | 9/1983 | Chisholm et al. |
| 4,460,947 | A | 7/1984 | Kelly |
| 4,847,959 | A | 7/1989 | Shimada et al. |
| 4,874,276 | A | 10/1989 | Iguchi |
| 4,878,792 | A | 11/1989 | Frano |
| 5,104,272 | A | 4/1992 | Dupont et al. |
| 5,775,859 | A | 7/1998 | Anscher |
| 6,497,003 | B2 | 12/2002 | Calabrese |
| 6,757,945 | B2 | 7/2004 | Shibuya et al. |
| 6,777,060 | B2 | 8/2004 | Sehmer et al. |
| 7,546,661 | B2 * | 6/2009 | Connor, Jr. ..................... 16/4 |
| 2001/0004784 | A1 | 6/2001 | Calabrese |
| 2003/0063961 | A1 | 4/2003 | Lay |
| 2004/0131444 | A1 | 7/2004 | Franco et al. |
| 2005/0129461 | A1 | 6/2005 | Bruno |

OTHER PUBLICATIONS

International Search Report and Written Opinion for Application No. PCT/US2009/000173, dated Sep. 3, 2009.

* cited by examiner

*Primary Examiner* — William L. Miller
(74) *Attorney, Agent, or Firm* — Dardi & Herbert, PLLC; Peter S. Dardi (57) ABSTRACT

The invention relates to method(s) and device(s) for accurately positioning and fastening a surface cover to the surface. A surface cover can be provided with a cover snap member that has a drill guide through which a hole can be drilled into the surface. The hole can be used to fasten a surface snap member, which snaps together with the cover snap member. The surface snap member can be attached to the surface through a separate screw. Alternatively, the surface snap member can comprise an integral screw that provides for self-attachment. The surface snap member can have a bore which aligns with the drill guide when the surface snap member and the cover snap member are snapped together. The user can snap the cover snap member and surface snap member and drill a hole into the surface through the channel formed by the aligned drill guide and bore.

20 Claims, 12 Drawing Sheets

SURFACE COVER WITH SNAP HAVING A DRILL GUIDE

FIELD OF THE INVENTION

This invention relates generally to snap-type fastener devices, and more particularly, to fasteners for retaining a surface cover to a surface, such as a floor cover to a floor. The invention further relates to methods for quickly and accurately preparing the surface through attachment to the surface of one or more snap members that mate with other snap members.

BACKGROUND OF THE INVENTION

Fasteners are conventionally used to engage two articles together, such as fastening a floor cover to a floor. A variety of floor covers are used to protect floors, aesthetically change the surface of floors, provide safer floors, or provide a comfortable walking surface. These floor covers can be attached in many ways depending on the particular context. On some surfaces, mats can be used for safety reasons to decrease the chance of slipping and/or for aesthetic reasons. Other surface covers provide aesthetic and/or functional purposes, such as canvas covers to provide protection from weather and wall covers to muffle noise.

SUMMARY OF THE INVENTION

In a first aspect, the invention pertains to a surface cover comprising a sheet of material and a cover snap member. The cover snap member comprises of an engagement flange configured to engage with the sheet of material and a cover snap element configured to engage a surface snap member. A drill guide extends through the cover snap element. The cover snap member is attached to the sheet of material at the hole so that the drill guide can be access through the material without obstruction.

In a further aspect, the invention pertains to a method of fastening comprising positioning a surface cover comprising a cover snap member secured to a material and a drill guide extending through the cover snap member, drilling an element into the surface through the drill guide, securing a surface snap member, and connecting a cover snap member with the surface snap member. The connection is a snap fit to fasten the surface cover to the surface.

In another aspect, the invention pertains to a snap fastener comprising a cover snap member and a surface snap member. The cover snap member comprises of a cover snap element and a drill guide extending there through. The surface snap member comprises of a surface snap element and a screw bore. The surface snap member is configured to make a snap connection with the cover snap element of the cover snap member with the screw bore aligned with the drill guide.

DETAILED DESCRIPTION OF THE INVENTION

With floor covers and other surface covers being an accessory, there is a desire for a versatile fastener that securely and accurately fastens a surface cover to a surface, such as a floor cover to a floor, to provide a secure surface cover on the selected surface or a section thereof. To securely fasten a surface cover, such as a floor cover to surface, the fastener can be comprised of several engaging parts, such as mated members which snap together. One member of the fastener can be attached to the surface cover while the other member is secured to the surface, such as a floor. To facilitate placement of surface covers at the selected location on the surface, the fastener member secured to the surface cover can be equipped with a drill guide to direct the location at which to secure the mated member of the fastener that secures to the surface. In some embodiments, the fastener is used for fastening floor covers to floors. More generally, the fastener can be used to fasten any surface cover to any surface. The fastener can be used to fasten covers to walls, ceilings, articles of furniture, surfaces of vehicles, and the like. The fastener can be used to fasten canvas covers to the ground to provide for a sturdy outdoor shelter (e.g. tents, canopies, or the like) or a relatively stationary surface (e.g. tarps or the like). The fastener can be used to fasten upholstery to furniture to provide for a cushioned seating or a new cover on the furniture (e.g. to provide a new texture or look, to replace the old cover, or the like). The fastener can be used to fasten automotive, marine, and miscellaneous covers and tops to automotive, marine, and miscellaneous surfaces.

Surface covers are used in a variety of contexts. For example, heavy wall or ceiling covers can be placed on surfaces to muffle sound or provide other aesthetic benefits. Also, mats, rugs or other floor covers can be placed in vehicles. In particular, mats or carpet can be placed on boat surfaces for safety reasons and/or for aesthetic appearances. In general, the improved fasteners and corresponding techniques can be used to secure the surface covers to the corresponding surfaces. Using the snap fasteners described herein, the surface covers can be easily removed and replaced for cleaning, other maintenance purposes or other desired purpose.

During the placement of the surface cover, it is desirable to be able install the surface coving without excessive effort. In general, to securely anchor the surface cover to the surface, a fastener component is secured to the surface. In embodiments of particular interest, a surface snap member is secured to the surface. The surface snap member should be secured at a location to match with the placement of cover snap member. Since one cover snap member is secured to the surface cover, the surface snap member secured to the surface should be properly placed so that the surface cover fits properly when snapped into place. Traditionally, measurements are made to select the placement of the surface snap member on the surface. However, measurements are prone to error and the tolerances for error can be small since the surface cover may not stretch or otherwise provide for significant deviations in placement without undesirable effects. Any errors in drilling can result in significant wasted effort in correcting the error, as well as the placement of unnecessary holes in the surface.

To guide the placement of the surface snap member on the surface, a cover snap member on the surface cover can be designed with a drill guide. This cover snap member is then mounted on the surface cover without blocking of the drill guide. Thus, an open channel then extends through the drill guide to provide the ability to drill through the surface cover using the drill guide without damaging the surface cover. The surface cover can then be placed at the selected location so that the one or more cover snap members with drill guides are at the proper location for drilling. Holes can then be drilled at the proper location without the need for measurements. In this way errors in placement of the holes can be avoided. In some embodiments, the surface snap member can be screwed directly into the surface at the select location using the drill guide to guide the direct insertion of the surface snap member into the surface.

Surface Cover

The surface cover has one or more holes that provide for securing the surface cover using snaps. Each snap has two members, a female member and a male member. One member secures to the surface while the other member engages the surface cover at a hole through the surface cover. The member that secures to the surface generally screws into the surface. The member that engages the surface cover has a drill guide that extends through the member and is open through the hole in the surface cover.

Figure 1:
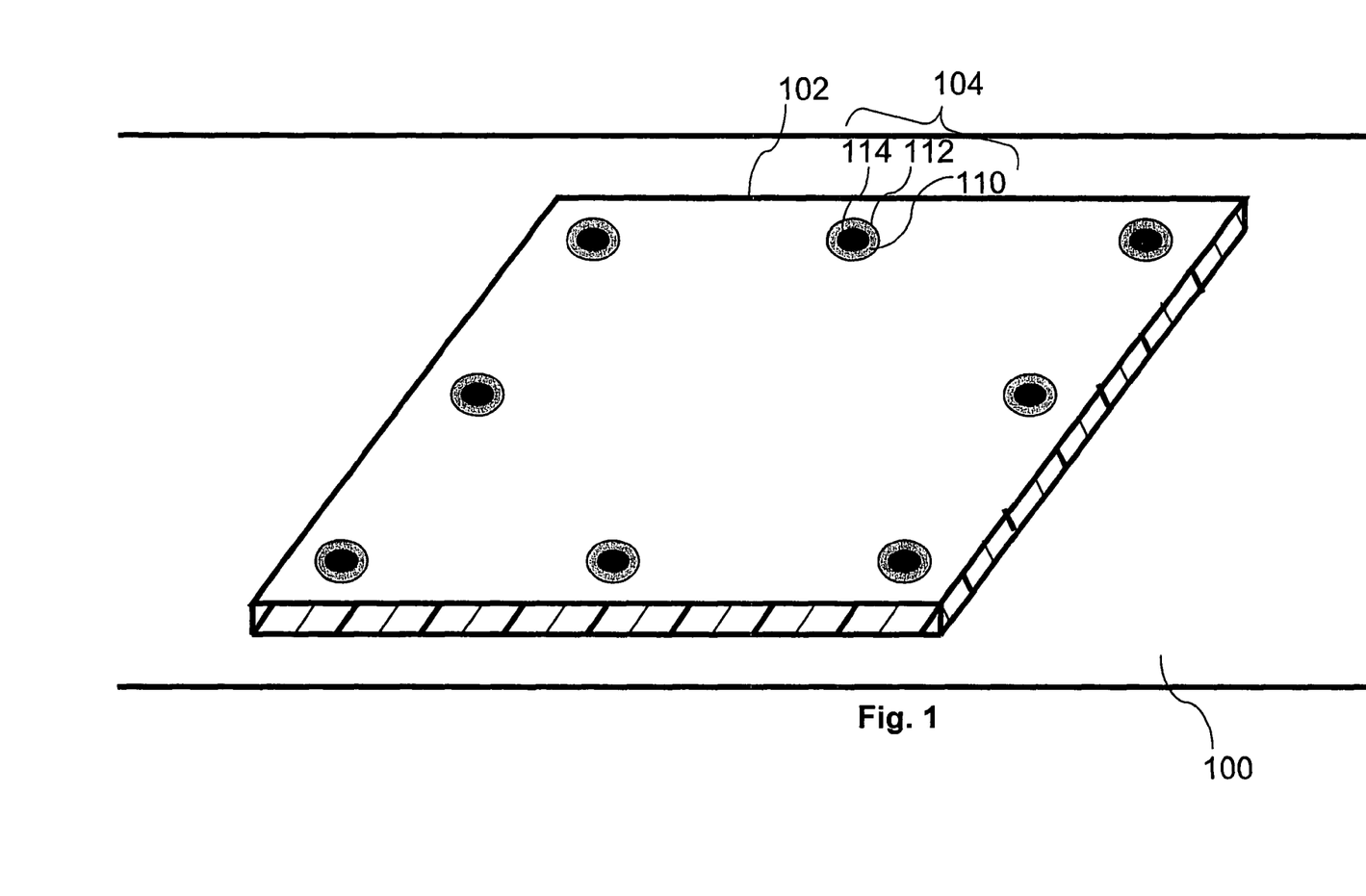
FIG. 1 is a perspective view of the surface cover fastened to the surface with a fastening device.
Figure 8:
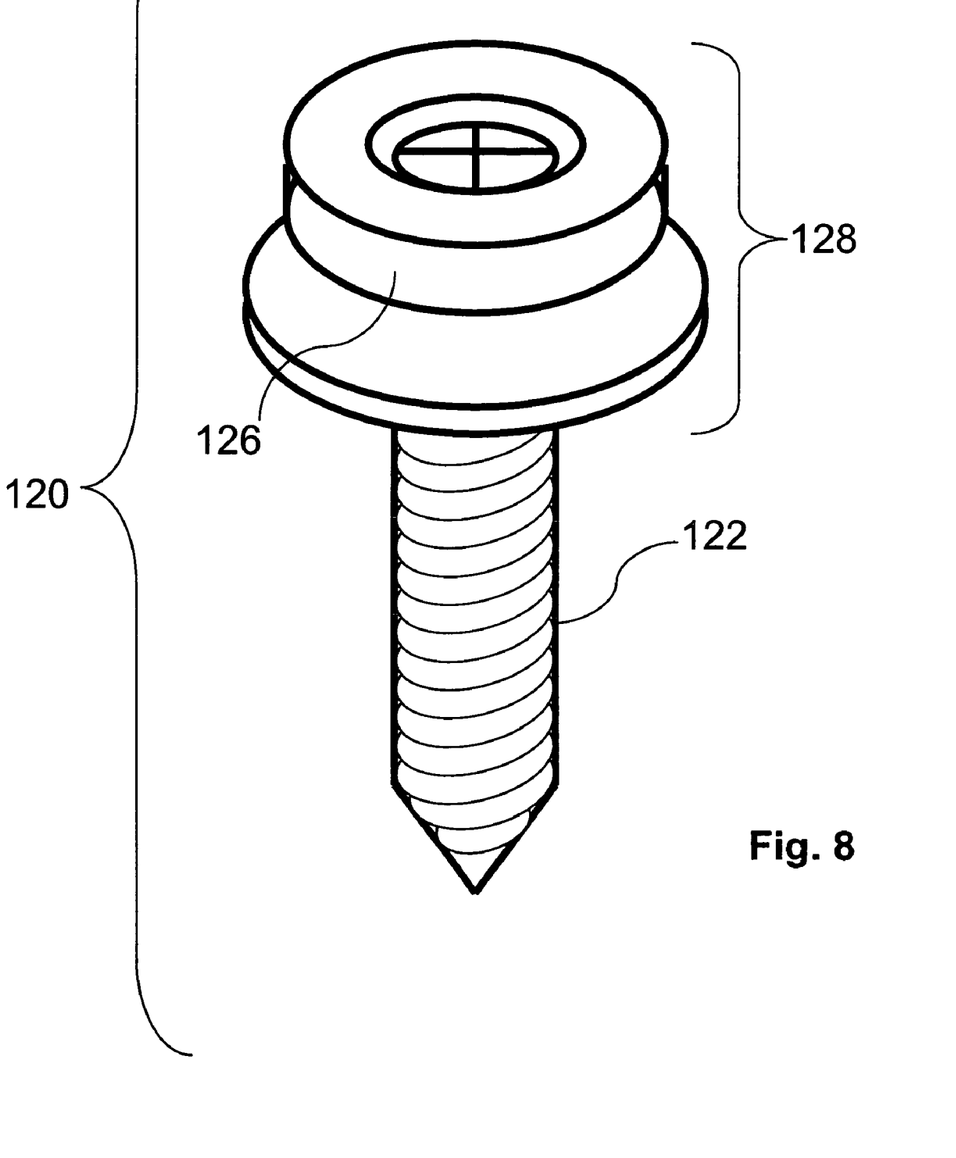
FIG. 8 is a side view of a single component surface snap member with a built-in screw.
Figure 9:
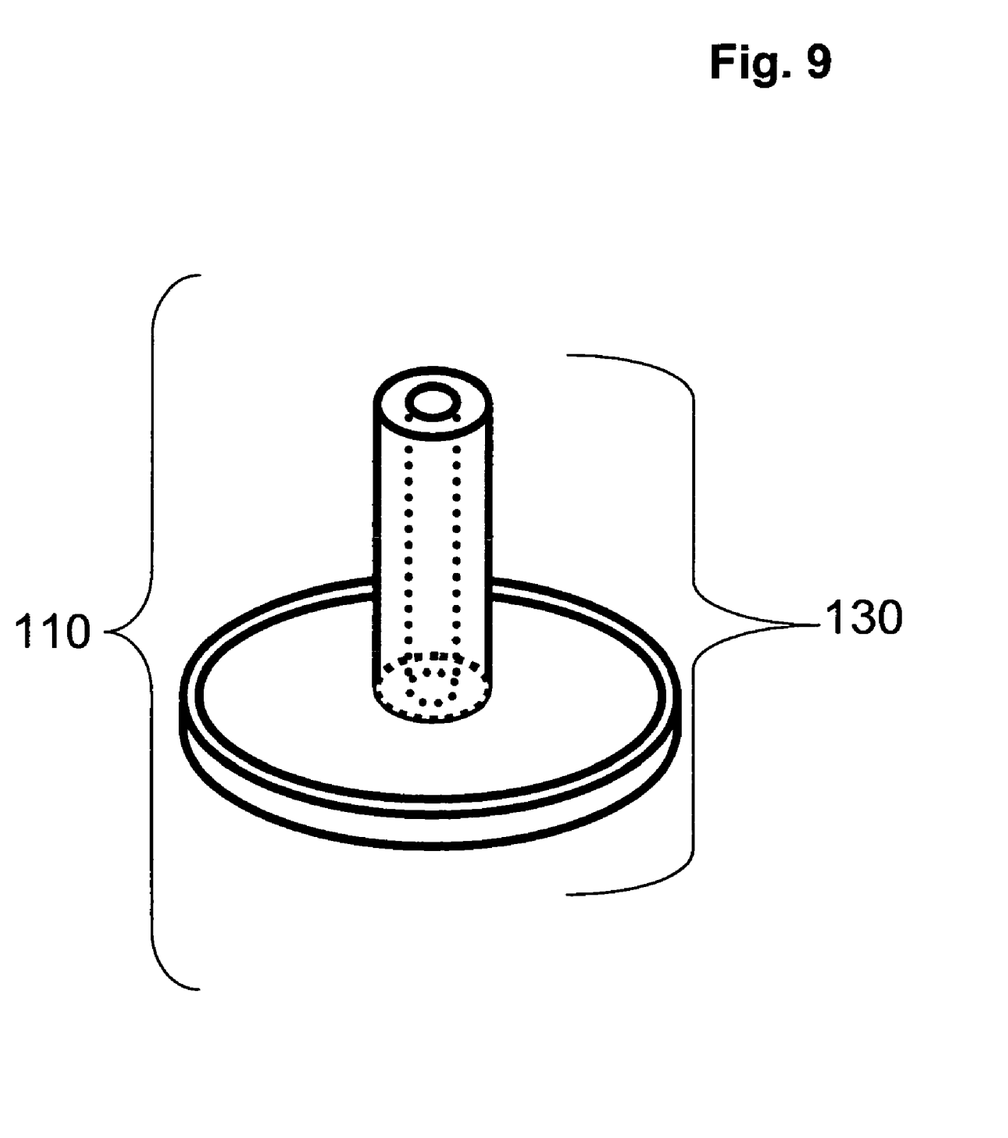
FIG. 9 is a side view from the bottom perspective of the first cover snap component of the cover snap member as shown in FIG. 4.
Figure 10:
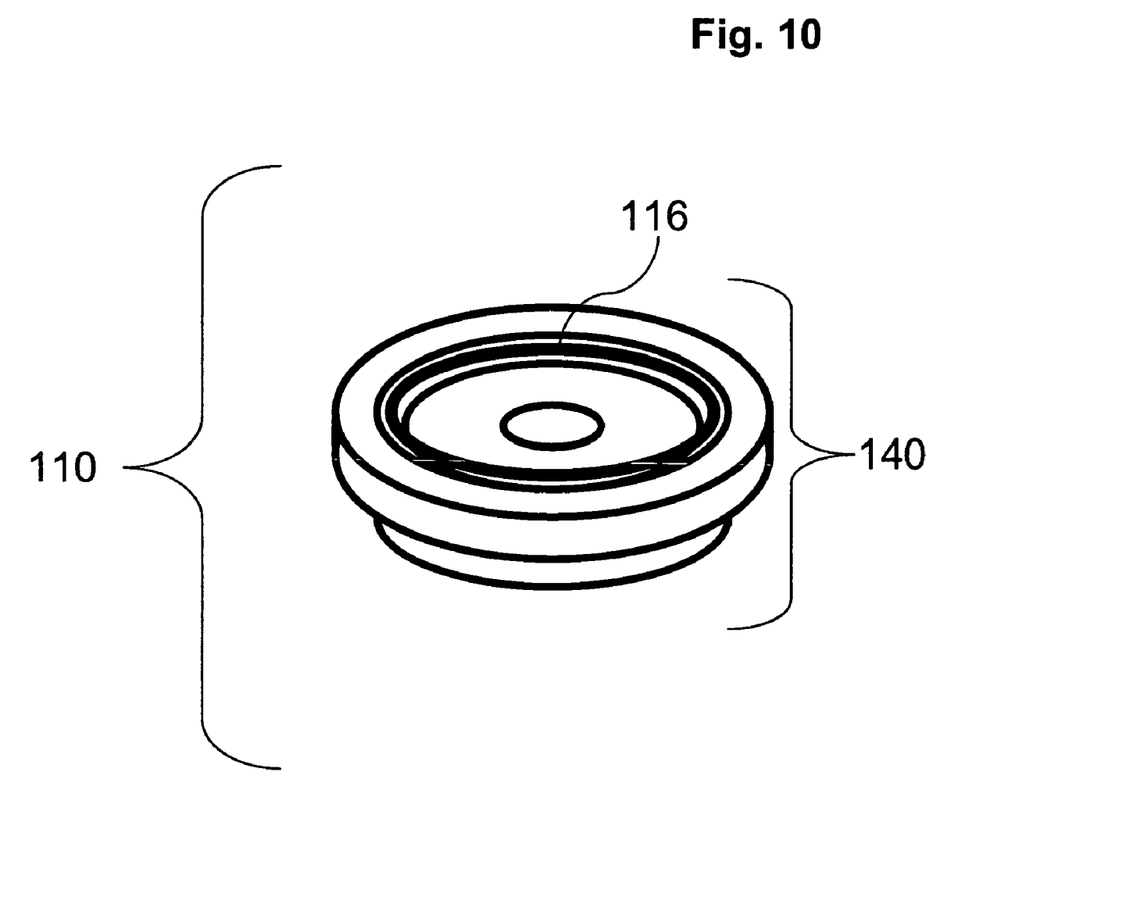
FIG. 10 is a side view from the bottom perspective of a second cover snap component of the cover snap member.
Figure 11:
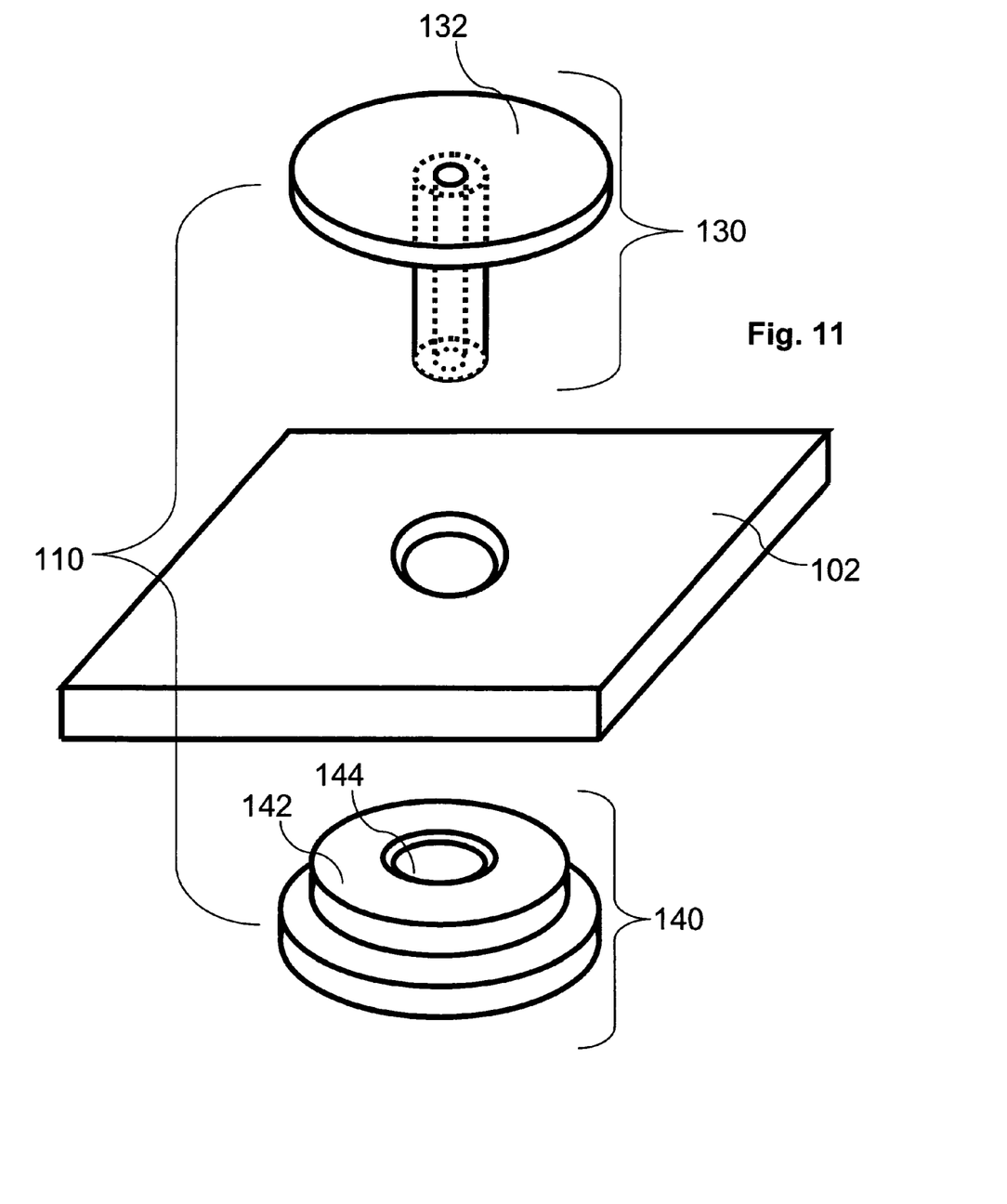
FIG. 11 is an exploded view in perspective of a two component cover snap member relative to the surface cover.

FIG. 1 shows a rectangular surface cover 102 secured to surface 100 by eight fasteners 104. In order to fasten a surface cover to a surface, at least one fastener is attached to the surface cover in either a permanent or detachable manner. In further embodiments, the surface cover engages 1, 2, 3, 4, 5, 6, 7, 9, 10, or more fasteners. The number of fasteners selected generally can depend on the size and material of the surface cover. The fastener member that engages the surface cover can be permanently attached to the surface cover, removably attached to the surface cover, or the member can engage the surface cover with an engagement flange or the like that only becomes secure upon snapping the member with its mated snap member. FIG. 8 shows a cover snap member 110 attaching the surface cover 102 to a surface 100. The engagement flange 112 of the cover snap member 110 abuts against the surface cover 102. The cover snap member is adapted to mate with the surface snap member.

The surface cover can be provided with at least 1, 2, 3, 4, 5, 6, 7, 8, 9, or 10 holes for engagement with cover snap members. The surface cover may be manufactured with at least one hole. If the surface cover is not manufactured with at least one hole, holes can be created, for example, by self-piercing cover snap members that pierce the surface cover when the snap is attached to the surface cover. FIGS. 2, 3, and 7-14 show a hole 106 through which a cover snap member 110 may be attached to the surface cover 102 in order to attach the surface cover 102 to the surface 100. A cover snap member can be placed into one of these holes, such that its engagement flange abuts against the surface cover. The cover snap member can be attached to the surface cover by sewing, adhesively attaching, welding, or mechanically attaching the cover snap member to the surface cover, and combinations thereof. The cover snap member can also be woven into the surface cover.

The surface cover can be made of any material or combination of materials, including but not limited to polymers, such as natural or synthetic rubbers, leathers, and fibers, or combinations thereof. Suitable fibers can be, for example, wool, cotton, polyester, nylon, or combinations thereof. Fibers can be woven appropriately to form the surface cover material. The surface cover can be formed from a combination of materials, such as a layered construction. The surface cover can be in any shape, including but not limited to circular, semi-circular, rectangular, triangular shape, or combinations thereof.

Fastener

Figure 2:
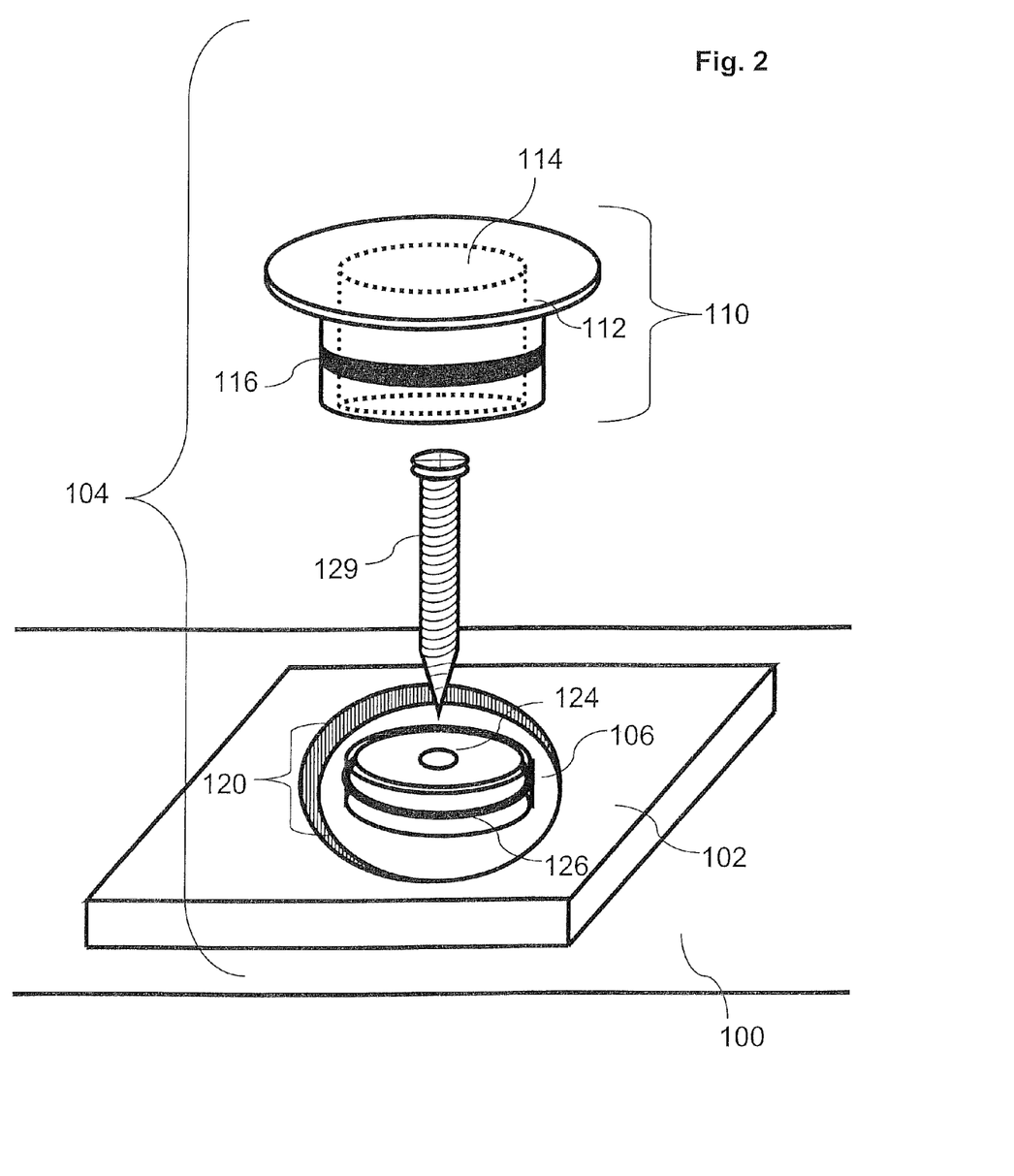
FIG. 2 is an exploded view in perspective of a first embodiment of a device for fastening a surface cover to a surface in accordance with the invention.
Figure 3:
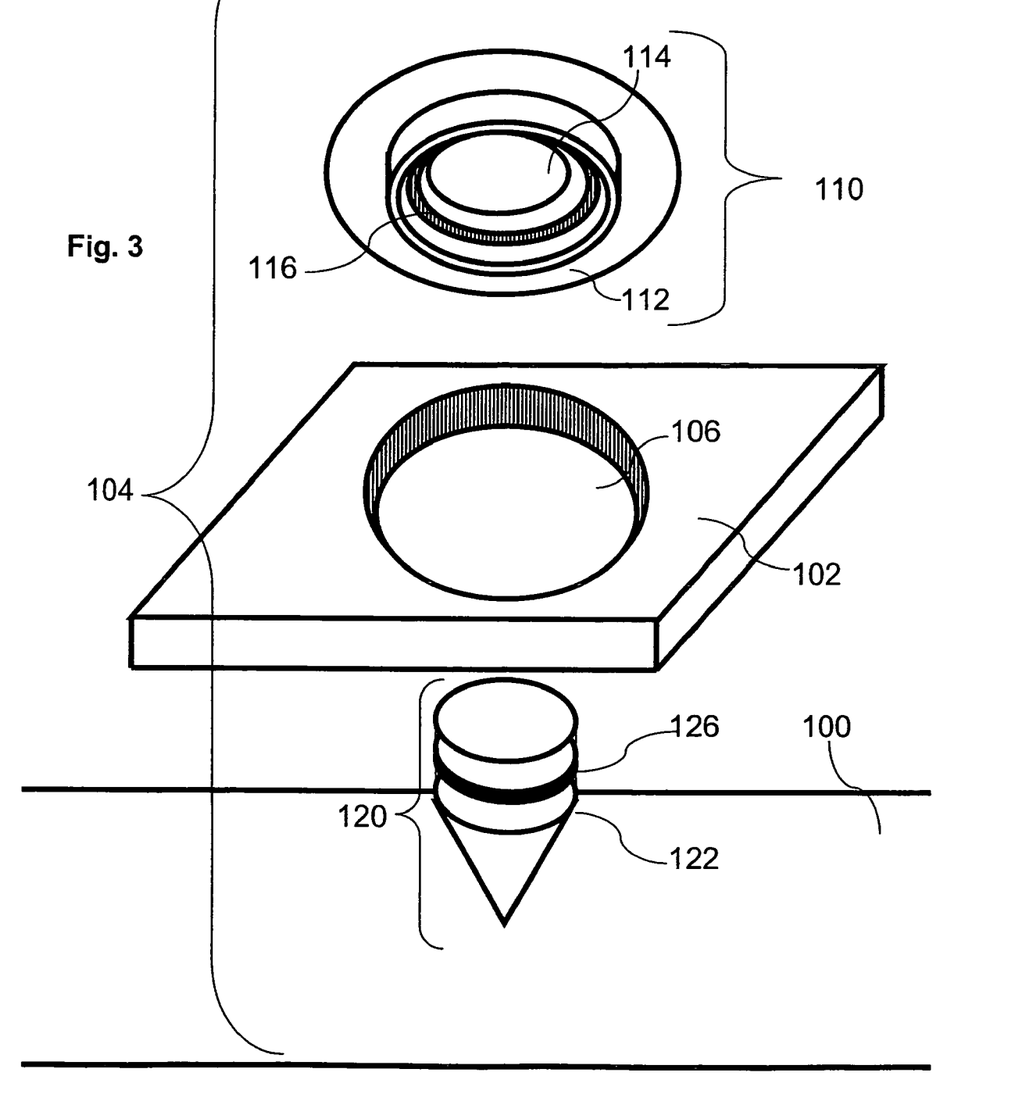
FIG. 3 is an exploded view in perspective of a second embodiment of a device for fastening a surface cover to a surface in accordance with the invention.
Figure 12:
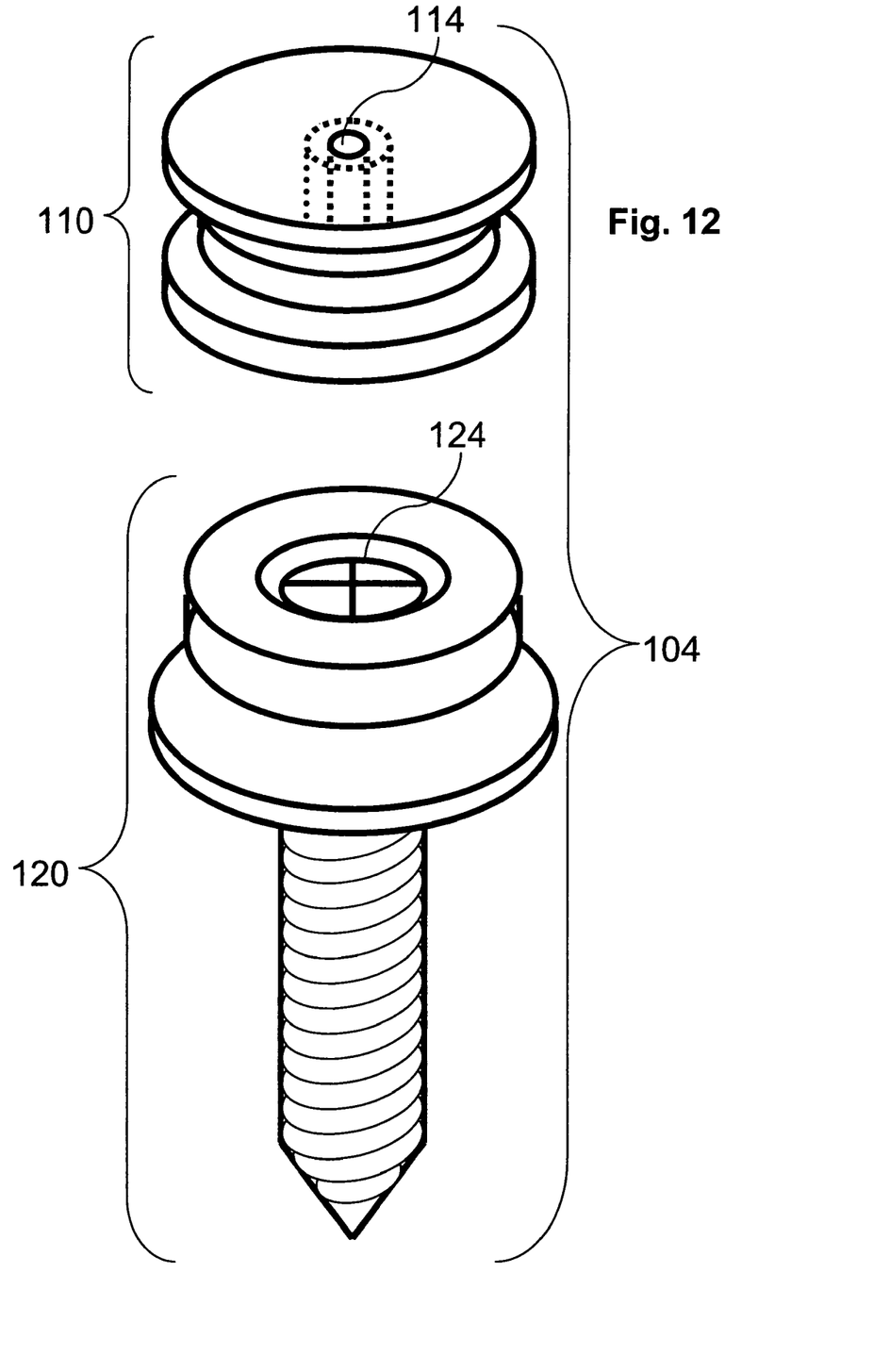
FIG. 12 is an exploded view in perspective of a third embodiment of a device for fastening a surface cover to a surface in accordance with the invention.
Figure 13:
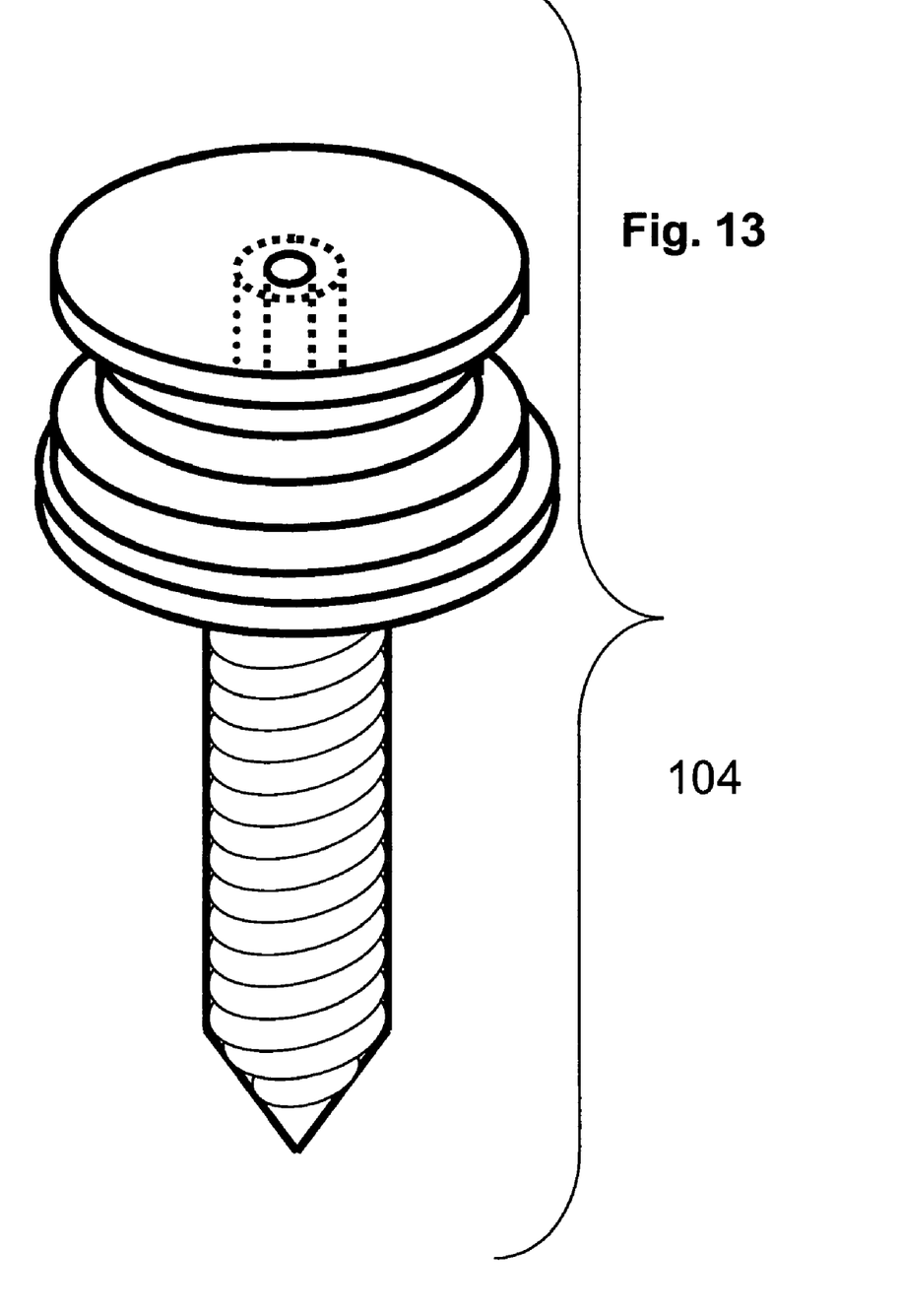
FIG. 13 is an exploded view in perspective of the device in FIG. 12 with the cover snap member and surface snap member mated together.
Figure 14:
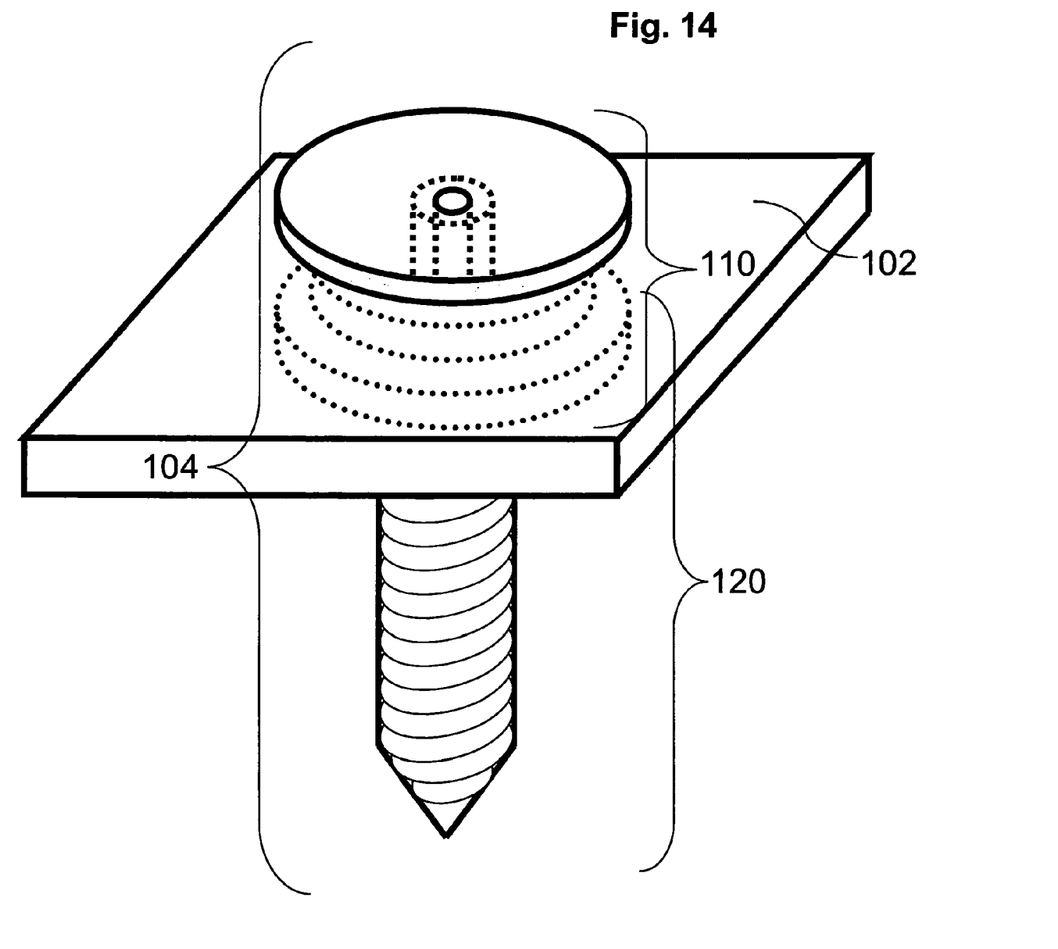
FIG. 14 is an exploded view in perspective of the device in FIG. 12 with the surface cover sandwiched between the cover snap member and surface snap member.

The snap fastener comprises a cover snap member, a surface snap member, and optionally a screw. To fasten the surface cover to the surface, the cover snap member can be attached to the surface cover, the surface snap member is attached to the surface, and the cover snap member is attached to the surface snap member. The surface snap member can be self-attached to the surface if it has an integral screw or the like, or attached to the surface by a screw, or the like. FIG. 2 shows an embodiment of the snap fastener 104, which includes a cover snap member 110, surface snap member 120, and screw 130. FIG. 3 shows the snap fastener 104, which includes the cover snap member 110 and surface snap member 120 but without the screw. The cover snap member 110 can be attached to the surface snap member 120 generally after the surface snap member 120 is attached to the surface. FIGS. 12-14 show the snap fastener 104, which includes the cover snap member 110 and the surface snap member 120.

The snap fastener operates through the attachment of a male component and a female component. Either the cover snap member or the surface snap member is a female component, and the other component is a male component. The female component receives the male component, or the male component is inserted into the female component. With the cover snap member attached to the surface cover, the cover snap member can be a female component by which the surface snap member in the form of a male component can snap into or the cover snap member can be a male component by which the surface snap member in the form of a female component can snap onto. FIGS. 2, 3, and 12-14 show the cover snap member 110 as the female component that receives and snaps onto the surface snap member 120, which is the male component.

The snap fasteners or similar fasteners, can be made of any suitable material, including but not limited to polymers, ceramics, composites, metals or combinations thereof. The materials generally have some resiliency to provide the snapping and unsnapping of the members. The snap fastener members can be formed with machining, molding, extruding, combinations thereof or with other suitable manufacturing approaches.

Cover Snap Member

The cover snap member comprises at least 1 component. FIGS. 1-7 and 9-13 show at least one component of the cover snap member 110. In some embodiments, the cover snap member comprises of one component as clearly shown in FIGS. 2 and 3. In other embodiments, the cover snap member comprises of two components, a first cover snap component 130 and a second cover snap component 140, as clearly shown in FIGS. 8-14.

Regardless of whether the cover snap member comprises of one or two components, the cover snap member can include at least one engagement flange, a drill guide, and a cover snap element. If the cover snap member 110 comprises of one component as shown in FIGS. 2 and 3, the cover snap member 110 can include an engagement flange 112, a drill guide 114, and a cover snap element 116.

If the cover snap member 110 comprises of two components, a first cover snap component 130 and a second cover snap component 140, as shown in FIGS. 8-14, the first cover snap component 130 comprises of a first engagement flange 132 that contacts the top surface of the surface cover 102 and the second cover snap component 140 comprises of a second engagement flange 142 that contacts the bottom surface of the surface cover 102 when assembled with the surface cover 102 therebetween.

The first cover snap component 130 has a drill guide 114 extending therethrough defined by a cylindrical sidewall. The cylindrical sidewall can protrude beyond the second engagement flange 142 of the second cover snap component 140 and define a stem. The second cover snap component 140 has a hole 144 adapted to receive the cylindrical sidewall that defines the drill guide 114. The underside of the second cover snap component 140 comprises of a cover snap element 116, which is shown as a ring trapped within snug recess. Either or both of the underside of the first cover snap component 130 or top side of the second cover snap component 140 can have a curvature or texture to snugly sandwich the surface cover 102.

The two component cover snap member can be preassembled to the surface cover by the manufacturer. A hole can be cut or punched into the surface cover 102 for positioning of the snap. Alternatively or additionally, the two component cover snap member can be attached to the surface cover by creating a hole into the surface cover using a self-piercing cover snap member. The hole can be sufficiently large to receive the cylindrical sidewall that defines the drill guide 114 but sufficiently small to provide a surface for the first engagement flange 132 to engage with the surface cover 102. Once the cylindrical sidewall is inserted into the hole through the top surface of the surface cover 102, some of the cylindrical sidewall is preferably protruding from the bottom surface of the surface cover 102. The cylindrical sidewall protruding from the bottom surface of the surface cover 102 is inserted into the hole 144 through the top surface of the second cover snap component 140 not through the underside of the second cover snap component 140, which comprises of a cover snap element 116. The cylindrical sidewall protruding from the underside of the second cover snap component 140 can be mechanically pressed against the inner surface of the second cover snap component 140 to snugly sandwich the surface cover 102 between the first cover snap component 130 and the second cover snap component 140.

In other embodiments, the drill guide 114 of the first cover snap component 130 is a hole extending through the first cover snap component 130 and does not extend beyond the second engagement flange 142 of the first cover snap component 130. In such a case, a hole corresponding to the size of the drill guide 114 can be formed into the surface cover 102. The drill guide 114 can be aligned with the hole in the surface cover, and the first cover snap component 130 can be sewn or mechanically or adhesively attached to the surface cover. The second cover snap component 140 can be mechanically or adhesively attached to the underside of the first cover snap component 130, aligning the drill guide 114 with the hole 144.

In other embodiments involving only a one-component cover snap member, only the second cover snap component 140 is attached to a hole in the surface cover 102. This may occur through sewing, mechanically attaching, or adhesively attaching the second cover snap component 140 to the hole in the surface cover 102. The second cover snap component 140 can be preassembled by the manufacturer. Alternatively, the end user assembles the second cover snap component 140 to the surface cover 102. In either embodiment, the second cover snap component 140 can be self-piercing to create holes into the surface cover 102 when the snap components are assembled. A second cover snap component 140 can be secured into a hole by sewing, mechanically attaching, or adhesively attaching the second cover snap component 140 to the surface cover 102. The second cover snap component 140 can then be snap engaged with the surface snap member. Alternatively, the second cover snap component 140 is not secured into the hole but immediately snap engaged with the surface snap member by the user.

The one- or two-component cover snap member can have a length and width from at least about 0.05 inch to about 5 inches. For example, the length can be about 0.37 inch. A person of ordinary skill in the art will recognize that additional ranges of dimensions within the explicit ranges above are contemplated and are within the present disclosure.

Figures 4, 5:
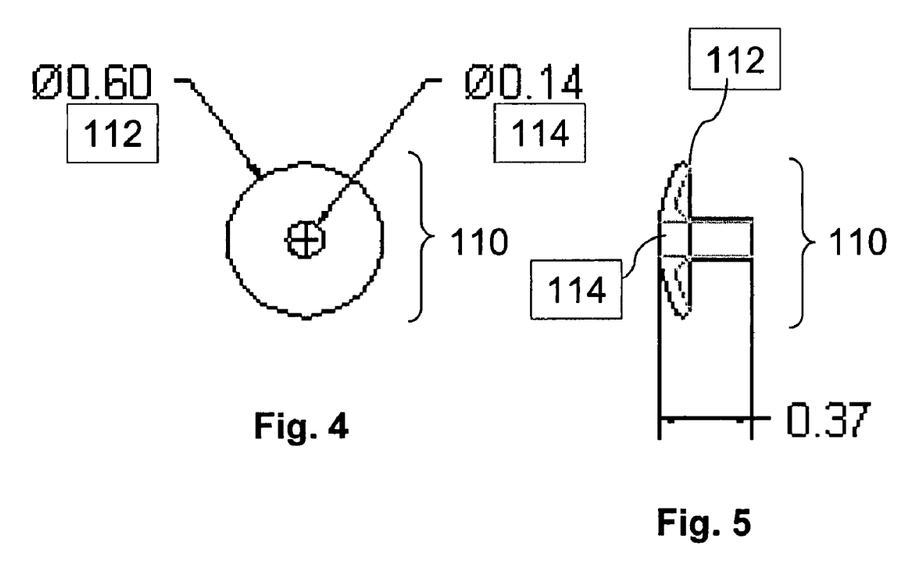
FIG. 4 is a top view of a first cover snap component of the cover snap member.
FIG. 5 is a side view of the first cover snap component of the cover snap member as shown in FIG. 4.
Figure 6:
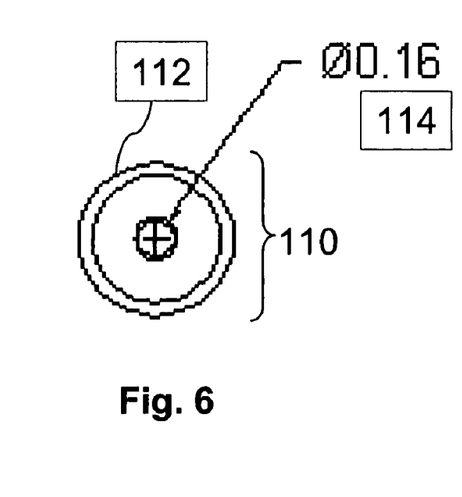
FIG. 6 is a rear view of the first cover snap component of the cover snap member as shown in FIG. 4.
Figure 7:
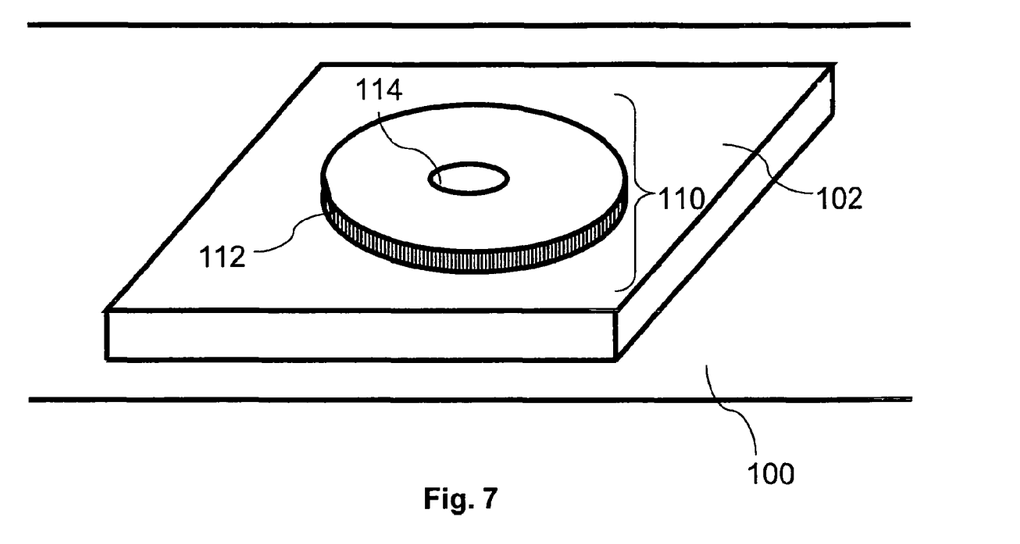
FIG. 7 is an exploded view in perspective of the surface cover fastened to the surface with the fastening device as shown in FIG. 1.

When the cover snap member is attached to the surface cover, an engagement flange can abut the top surface of the surface cover, and the cover snap element may be even with the bottom surface of the surface cover, recessed into the bottom surface, or protrude through the bottom surface. The engagement flange can have a selected shapes, including, for example, cylindrical, spherical, semi-spherical, rectangular, or triangular shapes, or combinations thereof. For example, FIGS. 2 and 3 show an embodiment having cylindrical engagement flanges. For example, FIGS. 4-6 show engagement flanges in the form of a semi-spherical shape with a concave surface. The engagement flange generally can have a diameter from at least about 0.05 inch to about 5 inches. For example, the diameter of the engagement flange can be 0.6 inch, as shown in FIG. 4. A person of ordinary skill in the art will recognize that additional ranges within the explicit ranges of diameters above are contemplated and are within the present disclosure.

The drill guide can be centrally located within the cover snap member, extending completely through the cover snap member. FIGS. 2-6, 9, and 11-14 show the drill guide 114 centrally located within and extending completely through the cover snap member 110. When the first cover snap component 130 and the second cover snap component 140 are in the assembled condition with the surface cover 102 sandwiched therebetween, the drill guide 114 in the first cover snap component 130 extends through the second cover snap component 140. The drill guide serves to guide a drill bit of a powered drill, shaft of a manual screw driver, a nail tap that interfaces with the head of a hammer, or other tools to a location on a surface and is sized accordingly. The drill guide can be sized to permit insertion of a tool to create an initial hole into the surface at which the screw, nail or the like is inserted either with the tool or subsequent to the formation of a hole or the like. The drill guide can have a diameter from at least about 0.05 inch to about 2 inches. For example, the diameter of the drill guide can be about 0.14 inch, as shown in FIG. 4, or about 0.16 inch, as shown in FIG. 6. A person of ordinary skill in the art will recognize that additional ranges of drill guide diameter are contemplated and are within the present disclosure.

Surface Snap Member

In some embodiments, the surface snap member 120 can comprise a surface snap element 126 (as shown in FIGS. 2, 3, 8, and 12) and a bore 124 (as shown in FIG. 2). The surface snap member can have a length and a width from at least about 0.05 inch to about 5 inches. A person of ordinary skill in the art will recognize that additional ranges within the explicit ranges of length and width are contemplated and are within the present disclosure.

When a surface snap member is attached to a surface, the top side of the surface snap member generally protrudes from the surface. To attach the surface snap member to the surface, the surface snap member can be provided with threads and/or a tapered tip, provided with a bore through which a screw or nail can be inserted, or combinations thereof. If the surface snap member is provided with threads and/or a tapered tip (i.e. the screw is integral with the surface snap member), the surface snap member can be attached to the surface without a separate screw, as shown in FIGS. 8 and 12-14. If the screw is not integral with the surface snap member, the surface snap member can have a bore through which the screw is inserted to attach the surface snap member to the surface, as shown in FIG. 2.

If the screw is integral with the surface snap member, the surface snap member 120 can comprise a shaft 122 that penetrates the surface, as shown in FIG. 3. The shaft can comprise threads, sharp tip, or tapered shape for ease in inserting the surface snap member into the surface. FIG. 3 shows the shaft 122 with a tapered point. FIGS. 8 and 12-14 show the shaft 122 with threads and a tapered point. As shown in FIGS. 8 and 12, the surface snap member can comprise a head 128 that comprises of the surface snap element, which is shown as a slight depression, concavity, or curvature. The bore 124 of the head 128 can include indentations that pattern after a drill bit of a power drill, tip of a manual screwdriver, or other tools. The bore can partially or completely extend through the surface snap member. The surface snap member can be self-tapping.

If the surface snap member is separately attached with a screw, the surface snap member 120 can be provided with a bore 124, as shown in the embodiment of FIG. 2. A screw 129 may be inserted into the bore 124 to secure the surface snap member 120 into the surface. The bore can be reasonably sized so the screw rests over the edges defining the bore to secure the surface snap member against the surface. The bore can have a diameter, for example, from at least about 0.05 inch to about 2 inch. A person of ordinary skill in the art will recognize that additional ranges of bore diameter within the explicit ranges above are contemplated and are within the present disclosure.

Fastening Mechanism

The cover snap member 110 and surface snap member 120 can each comprise of a snapping mechanism, such as a cover snap element 116 and surface snap element 126, respectively, that are mated such that they engage each other to form a snap fit connection between them. In other words, when engaged, the two snap members are held together with the snapping mechanism that then requires some force to disengage the snap members. The snap mechanism can comprise mated elements that engage each other, such as a depression, protrusion, or the like, with a protrusion engaging a depression when the male and female members are engaged. If the cover snap element has a depression, the surface snap element can have a corresponding protrusion to engage through elastic deformation with the depression.

The snap mechanism can be on the outer surface of the male member of the cover snap member and correspondingly on the inner surface of the female member of the surface snap member. In alternative embodiments, the snap mechanism can be on the inner surface of the female member of the cover snap member that defines the drill guide and correspondingly on the outer surface of the male member of the surface snap member. If the snap mechanism is on the outer surface of a male member of the cover snap member, the cover snap member can be inserted into a female member of the surface snap member, such that the cover snap element and the surface snap element form the snap fit connection. If the snap mechanism is on the inner surface of the cover snap element that defines the drill guide, the cover snap element is snapped onto the surface snap element of the surface snap member to form the snap fit connection.

A depression can take the form of an opening in the cover snap element. See U.S. Pat. No. 4,460,947 for an opening into which a latch member is snapped into. The opening can be almost completely or partially along the entire perimeter or circumference of the inner or outer surface of the cover snap element, such as a partial ring or a notch along the perimeter or circumference of the cover snap element. A protrusion can include a latch member that would snap into opening or latch onto the edges of the opening. The depression can also take the form of a sunken area in the cover snap element. The sunken area can be completely or partially along the entire perimeter or circumference of the inner or outer surface of the cover snap element in the form of a ring around the entire perimeter or circumference, ring around part of the perimeter or circumference, etc. A protrusion can include a ridge that would snap or pop into the sunken area.

FIG. 2 shows the cover snap member 110 with a cover snap element 116 that is in the form of a ridge surrounding the inner surface of the cover snap member and that helps define the drill guide 114. FIG. 2 also shows the surface snap member 120 with a surface snap element 126 that is in the form of a sunken area surrounding the outer surface of the surface snap member. In FIG. 2, the cover snap element, having a ridge, 116 of cover snap member 110 would snap onto the surface snap member 120 by its surface snap element 126 at a sunken area. Alternatively, the cover snap element comprises of a depression, the surface snap element comprises of a protrusion, and the cover snap member is still snapped onto the surface snap member, as shown in FIG. 3.

Although not shown in the figures, the cover snap element 116 can comprise of several depressions, and the surface snap element 126 can comprise of several protrusions, and vice versa. For example, the cover snap element 116 can comprise of several rings of sunken areas configured to mate in a snap fit connection with several rings of ridges in the surface snap element 126. Alternatively, the cover snap element 116 can comprise of at least one depression and at least one protrusion, and the surface snap element 126 can comprises of at least one protrusion and at least one depression. For example, the cover snap element 116 may comprise of at least one sunken area and at least one ridge configured to mate in a snap fit connection with at least one ridge and at least one sunken area of the surface snap element 126. A person of ordinary skill in the art will recognize that additional snap designs are possible including, for example, a range of designs known in the art as well as future derived variations and that these designs can be adapted to cooperate with the incorporation of a drill guide based on the teachings herein.

In some embodiments, the surface snap element can self-attach to the surface without a separate screw, as shown in FIGS. 3, 8, and 12-14. FIG. 3 shows the surface snap member 120 can be hammered into the surface. The relatively sharp point on the surface snap member can facilitate insertion into the surface. In another embodiment, the surface snap member includes an integral screw. The sharp point can be provided with threads, and/or the head can be provided with slot(s) to facilitate screwing of the surface snap member into the surface. In other embodiments, the surface snap element is attached to the surface with a screw (as shown in FIG. 2). The surface snap member can be in the form of a screw, nail, tack, or other fasteners by including threads like a screw or sharp, tapered tip like a nail or tack (as shown in FIGS. 2, 3, 8, and 12-14). The surface snap member can be attached to the surface with a screw, nail, tack, or other fasteners.

FIGS. 8-14 show the cover snap member 110 with a cover snap element in the form of a ring snugly fit into the recess on the underside of the second cover snap component 140. The ring is adapted to mate in a snap fit fashion into the slight depression, curvature, indentation, or concavity formed on the outside of the head of the surface snap member 120. As discussed above the depression could be formed on the underside of the second cover snap component, and the protrusion could be formed on the outer surface of the head of the surface snap member.

Method

Fastening a surface cover to a surface generally involves positioning the surface cover along the surface, determining where to secure a surface snap member to the surface based on the corresponding positions of the cover snap members, securing the surface snap member to the surface, and connecting the cover snap member with the surface snap member. These steps need not be performed in this order. For example, the cover snap member can be connected with the surface snap member before other steps are performed. The cover snap member can be provided with a drill guide, and the surface snap member can be provided with a bore. When the cover snap member and the surface snap member are connected, the drill guide can align with the bore to form a continuous hole through which the drill can access the surface. The surface cover with the snap members connected can be positioned on the surface, and a screw can be drill through the snap members to secure the surface cover to the surface without the additional step of connecting the snap member with the surface snap member.

Prior to positioning the surface cover along the surface, the cover snap member can be attached to the surface cover. Either the surface cover is provided with the cover snap member pre-attached or the user attaches the cover snap member to the surface cover. The user can make the openings into the surface cover to place the cover snap member into the opening. The surface cover may be provided with perforations or markings that define openings, and the user may be required to break desired perforations or cut along desired markings to form desired openings. The surface cover can also be without perforations or markings that define openings to allow the user to freely make the opening(s) anywhere on the surface cover. Although if the cover snap members are associated with the cover by the manufacturer or distributor, the user can focus on the installation without the concern about the attachment of the cover snap members.

When a mark is made on the surface through the drill guide of the cover snap member, the surface snap member can be aligned with the mark and a screw can be inserted through the bore of the surface snap member and into the mark. The surface snap member can already be connected with the cover snap member, and the ensemble can be aligned with the mark. Instead of a mark, a hole can be drilled into the surface. The surface snap member is fastened to the surface using the hole. Alternatively, if the surface snap member is provided with a bore, the surface snap member can be positioned on the surface, such that its bore is aligned with the hole. Alternatively, the surface snap member can include an integral screw that can be inserted and screwed into the hole.

Making the mark is optional, and the hole can be made directly through the drill guide and into the surface. The hole can be made in a separate step or simultaneously with any, some, or all of the steps of securing the surface snap member to the surface, securing the screw to the surface, or securing the cover snap member to the surface. For example, the surface snap member can already be connected with the cover snap member, and the ensemble can be secured to the surface by the screw. The drill guide in the cover snap member can have a larger diameter than the bore of the surface snap member, such that the screw can rest on the surface snap member without interfering with the ability of the cover snap member from snapping onto or unsnapping from the surface snap member. In another example, the surface snap member can be secured to the surface by the screw, followed by fastening the cover snap member onto the surface snap member.

If the surface snap member attaches to the surface without a separate screw, the surface snap member can be secured into the surface in a separate step or simultaneously with any, some, or all of the steps of securing the surface snap member to the surface and securing the cover snap member to the surface. For example, the surface snap member can already connected with the cover snap member, and the surface snap member is screwed into the surface. In another example, the surface snap member can be secured to the surface, followed by fastening the cover snap member onto the surface snap member.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A surface cover comprising:
 a sheet of material comprising a top surface, a bottom surface, and a hole extending through the sheet of material;
 a surface snap member comprising a surface snap element;
 a screw engaging the surface snap member; and
 a cover snap member comprising an engagement flange engaging with the top surface of the sheet of material and a cover snap element releasably engaging the surface snap element positioned below the sheet of material with the screw extending from the bottom surface of the sheet of material, wherein a drill guide extends through the cover snap element,
 wherein the cover snap member is attached to the sheet of material at the hole so that the drill guide is accessible through the material without obstruction when the cover snap member is released from engagement with the surface snap member.

2. The surface cover of claim 1, wherein a plurality of said cover snap members are attached to the sheet of material at a plurality of said holes.

3. The surface cover of claim 1, wherein the cover snap element comprises of either a protrusion or a depression.

4. The surface cover of claim 1, wherein the cover snap member is detachably engaged with the sheet of material.

5. The surface cover of claim 1, wherein the cover snap member is sewn to the sheet of material.

6. The surface cover of claim 1, wherein the hole is located at a corner of the sheet of material.

7. The surface cover of claim 1, wherein the cover snap member is mechanically attached to the sheet of material.

8. The surface cover of claim 1, wherein the screw is integral with the cover snap member.

9. The surface cover of claim 1, wherein a top surface of the surface snap member defines a screw engagement flange and the screw engages the screw engagement flange.

10. The surface cover of claim 1 wherein the cover snap element extends from the engagement flange and passes through the sheet of material.

11. The surface cover of claim 1, wherein the cover snap element extends below the bottom surface of the sheet of material.

12. A method of fastening comprising:
    positioning a surface cover on a surface, the surface cover comprising a cover snap member secured to a material, wherein a drill guide extends through the cover snap member which is accessible through the material;
    drilling an element into the surface through the drill guide;
    securing a surface snap member to the surface; and
    connecting the cover snap member with the surface snap member, wherein the connection is a snap fit to fasten the surface cover to the surface.

13. The method of claim 12, wherein the material comprises of a preformed hole and the cover snap member is secured to the material at the preformed hole.

14. The method of claim 12, further comprising forming a hole at which the cover snap member is secured.

15. The method of claim 12, wherein the step of securing the surface snap member to the surface comprises of drilling the element through the surface snap member.

16. The method of claim 15, wherein the step of marking is performed using the cover snap member.

17. The method of claim 12,
    wherein the surface snap member comprises of a bore; and
    wherein the step of securing the surface snap member to the surface comprises of drilling the element through the bore of the surface snap member.

18. The method of claim 12, further comprising marking the surface where drilling occurs.

19. The method of claim 12, wherein the step of connecting the cover snap member with the surface snap member is performed prior to the step of drilling.

20. The method of claim 12, wherein the step of securing the surface snap member is performed after the step of drilling.

* * * * *